US007292291B2

(12) United States Patent
Dunn et al.

(10) Patent No.: US 7,292,291 B2
(45) Date of Patent: Nov. 6, 2007

(54) FLAT PANEL DISPLAY HAVING INTEGRAL HEATER, EMI SHIELD, AND THERMAL SENSORS

(75) Inventors: William R. Dunn, Alpharetta, GA (US); Keuk-Sang Kwon, Kumi (KR); Hyoung-Yol Park, Kumi (KR); In-Byeong Kang, Kumi (KR)

(73) Assignee: American Panel Corporation, Alpharetta, GA (US)

( * ) Notice: Subject to any disclaimer, the term of this patent is extended or adjusted under 35 U.S.C. 154(b) by 29 days.

(21) Appl. No.: 10/769,838

(22) Filed: Feb. 2, 2004
(Under 37 CFR 1.47)

(65) Prior Publication Data

US 2005/0073642 A1 Apr. 7, 2005

Related U.S. Application Data

(63) Continuation-in-part of application No. 10/679,977, filed on Oct. 7, 2003.

(51) Int. Cl.
*G02F 1/133* (2006.01)

(52) U.S. Cl. ........................................................ 349/72

(58) Field of Classification Search ............ 349/19–21, 349/41–43, 72
See application file for complete search history.

(56) References Cited

U.S. PATENT DOCUMENTS

| | | | | |
|---|---|---|---|---|
| 5,467,085 | A | 11/1995 | Dunn | 340/971 |
| 5,736,922 | A | 4/1998 | Goode, III et al. | 340/974 |
| 5,818,010 | A | 10/1998 | McCann | |
| 5,896,098 | A | 4/1999 | Goode, III et al. | 340/974 |
| 6,067,062 | A * | 5/2000 | Takasu et al. | 345/87 |
| 6,089,751 | A | 7/2000 | Conover et al. | |
| 6,133,979 | A * | 10/2000 | Komatsu et al. | 349/161 |
| 6,417,900 | B1 | 7/2002 | Shin et al. | |
| 6,628,355 | B1 | 9/2003 | Takahara | |
| 6,774,883 | B1 * | 8/2004 | Muhlemann | 345/101 |
| 6,885,412 | B2 * | 4/2005 | Ohnishi et al. | 349/72 |

* cited by examiner

*Primary Examiner*—James A. Dudek
(74) *Attorney, Agent, or Firm*—Standley Law Group LLP

(57) ABSTRACT

A flat panel display having a black mask EMI layer isolated from Vcom and tied to zero potential. The flat panel display has an integral metal heater layer and thermal sensor that are in close proximity to the liquid crystals to provide efficient heating and temperature sensing.

6 Claims, 15 Drawing Sheets

FPC
EMI Signal
BM pattern
D-IC
EMI Signal

Figure 1: Prior Art

Laminated front AR/EMI cover and rear heater glasses 50
52
54
56
72
76
Anti-Reflective (AR) Coating 78
Front Polarizer
PSA (Pressure Sensitive Adhesive)
LCD Color Plate
BM (Black Mask, Cr) 58
CF (Color Filter) 60
Vcom ITO 62
Polyamide Alignment Layer 64
TFT Array 66
Insulator 68
Heater ITO 70
LCD TFT Plate
PSA (Pressure Sensitive Adhesive) 74
Rear Polarizer
Anti-Reflective (AR) Coating 78
LC Fluid 65
Edge Seal

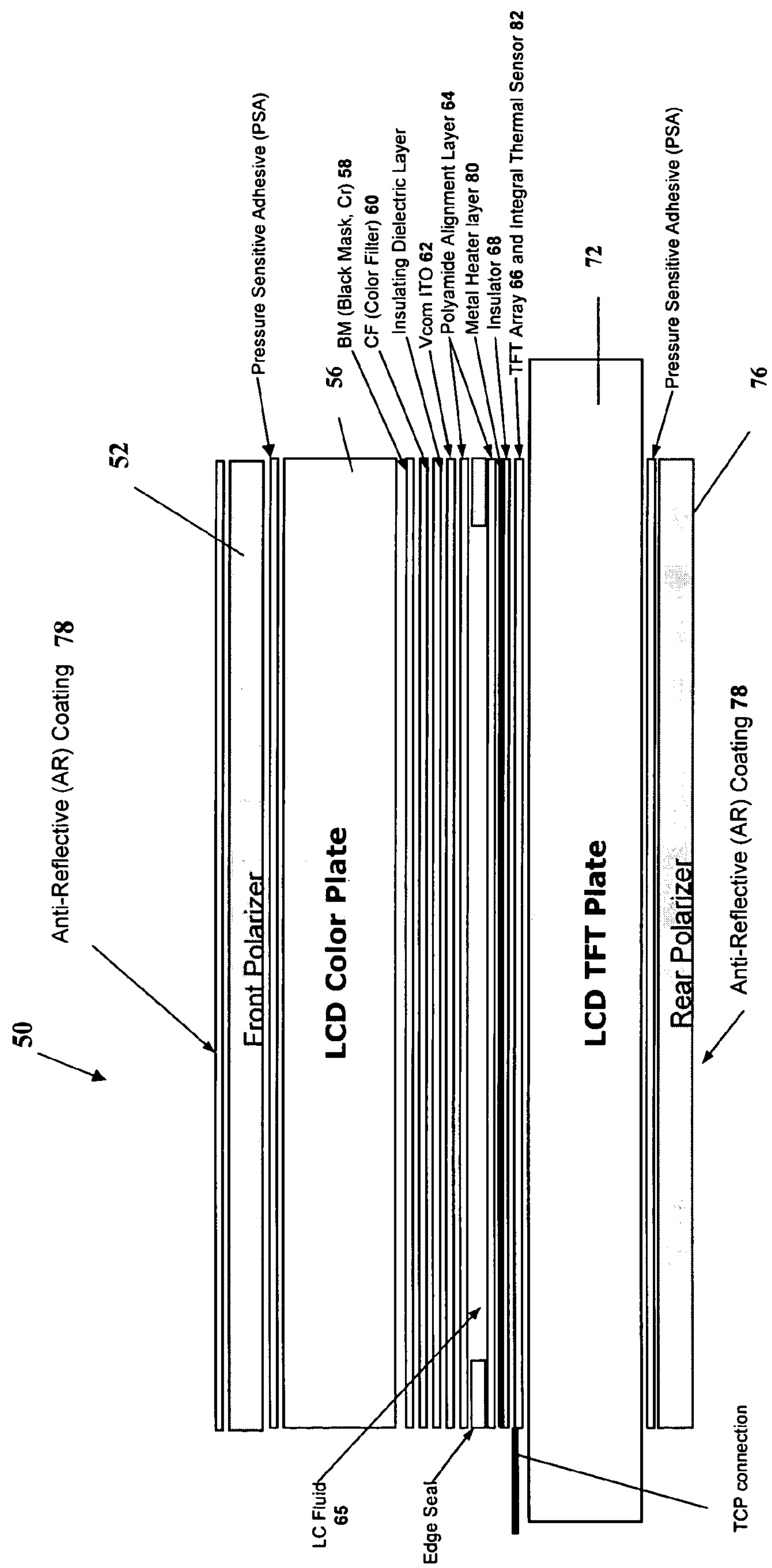

Figure 4
50
Anti-Reflective (AR) Coating 78
52
Front Polarizer
Pressure Sensitive Adhesive (PSA)
56
LCD Color Plate
BM (Black Mask, Cr) 58
CF (Color Filter) 60
Insulating Dielectric Layer
Vcom ITO 62
Polyamide Alignment Layer 64
Metal Heater layer 80
Insulator 68
TFT Array 66 and Integral Thermal Sensor 82
72
LCD TFT Plate
Pressure Sensitive Adhesive (PSA)
76
Rear Polarizer
Anti-Reflective (AR) Coating 78
LC Fluid 65
Edge Seal
TCP connection

| | Function of linear fit | ΔVts |
|---|---|---|
| R=100Meg | Y=30.32X-92.93 | 5.3V |
| R=10Meg | Y=36.10X-72.18 | 4.4V |
| R=5Meg | Y=37.95X-64.55 | 4.05V |

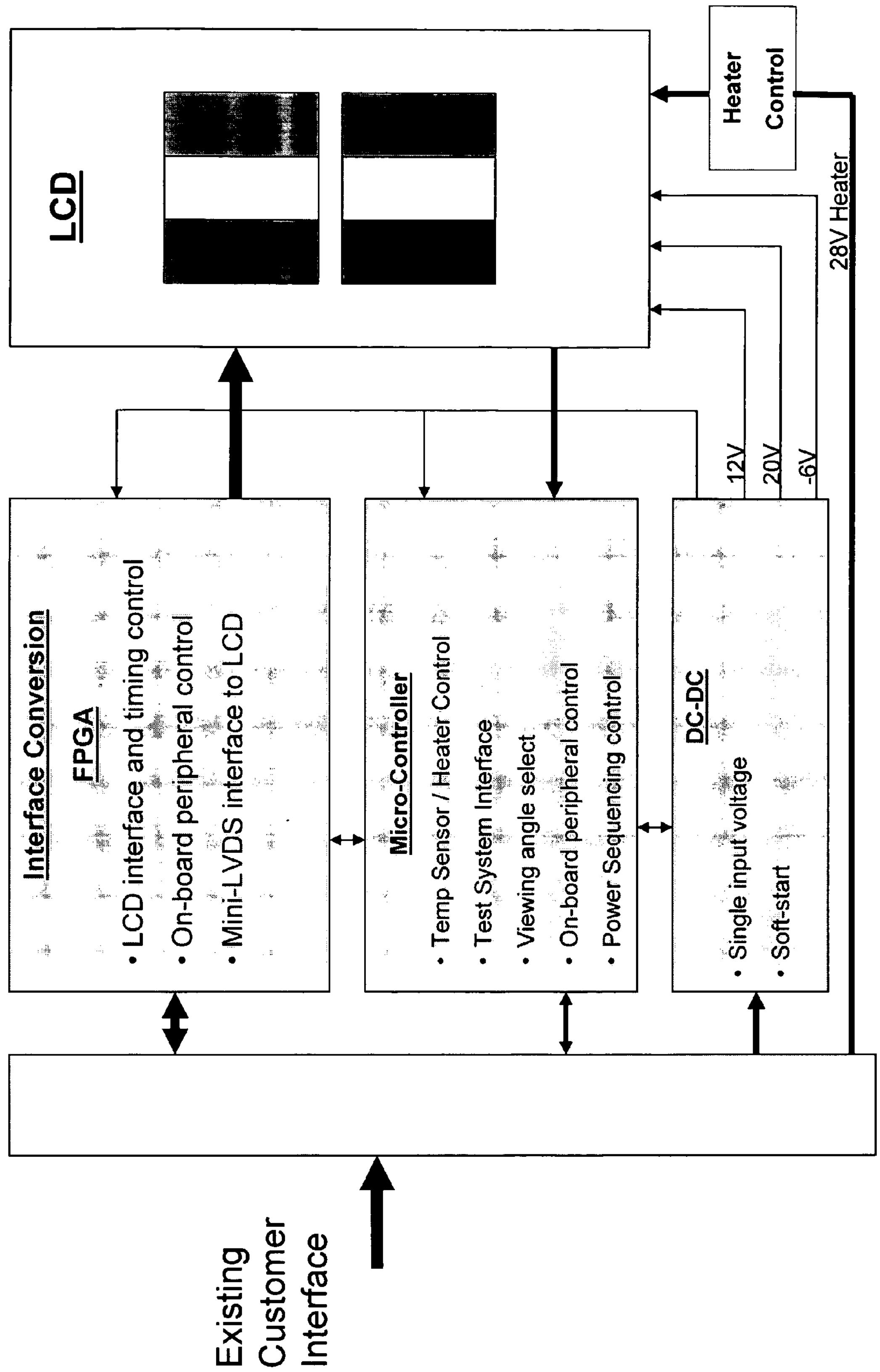
Figure 14
LCD
Heater Control
28V Heater
12V
20V
-6V
Interface Conversion
FPGA
• LCD interface and timing control
• On-board peripheral control
• Mini-LVDS interface to LCD
Micro-Controller
• Temp Sensor / Heater Control
• Test System Interface
• Viewing angle select
• On-board peripheral control
• Power Sequencing control
DC-DC
• Single input voltage
• Soft-start
Existing Customer Interface

FLAT PANEL DISPLAY HAVING INTEGRAL HEATER, EMI SHIELD, AND THERMAL SENSORS

This application is a continuation-in-part of pending U.S. application Ser. No. 10/679,977, filed on Oct. 7, 2003.

BACKGROUND AND SUMMARY OF THE INVENTION

The present invention relates to a liquid crystal flat panel display. More particularly, in one embodiment, the flat panel display of the present invention has layers of Indium Tin Oxide (ITO), or other optically transparent electrically conductive materials, coated on the front and rear external glass surfaces under the front and rear polarizers. The ITO layer at the front of the display acts as an electromagnetic interference (EMI) filter or shield. The ITO layer at the back of the display is used as a heater. Each ITO layer may or may not be overcoated on one or both sides with index matching dielectrics to improve optical transmission through the ITO coatings, and/or reduce the optical reflections at the front and/or rear surfaces of the ITO layers.

In an alternative embodiment, the ITO heater layer is placed on the inside surface of the rear glass plate allowing the ITO heater layer to be closer to the liquid crystal layer. This reduces the thermal resistance between the ITO layer and the liquid crystal layer thus reducing the amount of power necessary to heat the liquid crystal layer. In the preferred embodiment, bus bars are placed along predetermined edges of the ITO heater layer. The bus bars allow for the uniform injection of current into the ITO heater layer. It is also preferred that thermal sensors be placed on the inside portion of the glass and in close proximity to the ITO layer to detect the heat being inputted into the liquid crystal layer.

In another alternative embodiment, an integral metal heater is used instead of the ITO heater layer. The metal heater is applied to the TFT layer and is in close proximity to the liquid crystal layer to provide improved and efficient heating capabilities.

In another alternate embodiment, a black mask EMI layer is interposed between the front and back glass plates. In the preferred embodiment, the EMI layer is isolated from Vcom and tied to zero potential. It is preferred that the integral metal heater be placed behind the black mask EMI layer so that no portion of the heater is visible and no portion of the heater interferes with the pixel apertures.

In another alternate embodiment, integral thermal sensors may also be layered onto the TFT array layer preferably under the black mask EMI layer. In this embodiment, thermal resistivity between the integral heater and the thermal sensor(s) is reduced leading to faster thermal sensor response times. It is appreciated, as discussed in further detail below, that features of the alternate embodiments discussed above may be combined to form additional alternative flat panel display designs. For example, a flat panel display may be configured with all of the inventions of the isolated black mask EMI layer, integral thermal sensor and integral heater combined in one flat panel display.

In addition to the features mentioned above, objects and advantages of the present invention will be readily apparent upon a reading of the following description.

BRIEF DESCRIPTION OF THE DRAWINGS

Novel features and advantages of the present invention, in addition to those mentioned above, will become apparent to those skilled in the art from a reading of the following detailed description in conjunction with the accompanying drawings wherein similar reference characters refer to similar parts and in which:

FIG. 4 illustrates an alternative embodiment of the flat panel display of the present invention;

FIG. 14 illustrates an example block diagram of the electrical components and connections of a display incorporating the flat panel display of the present invention.

DETAILED DESCRIPTION OF PREFERRED EMBODIMENT(S)

The preferred system herein described is not intended to be exhaustive or to limit the invention to the precise forms disclosed. They are chosen and described to explain the principles of the invention, and the application of the method to practical uses, so that others skilled in the art may practice the invention.

Figure 1:
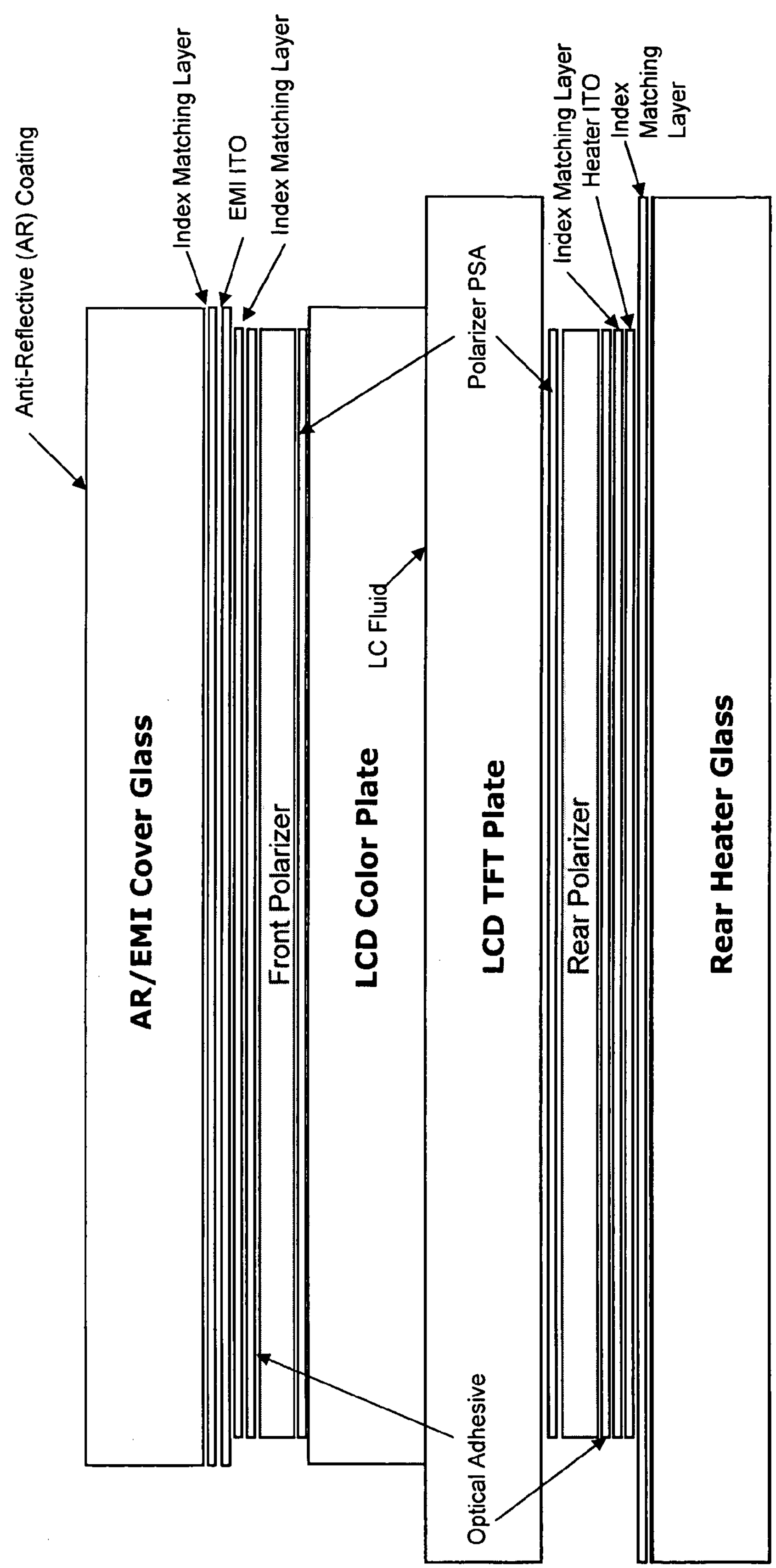
FIG. 1 illustrates a known flat panel display system.
Figure 2:
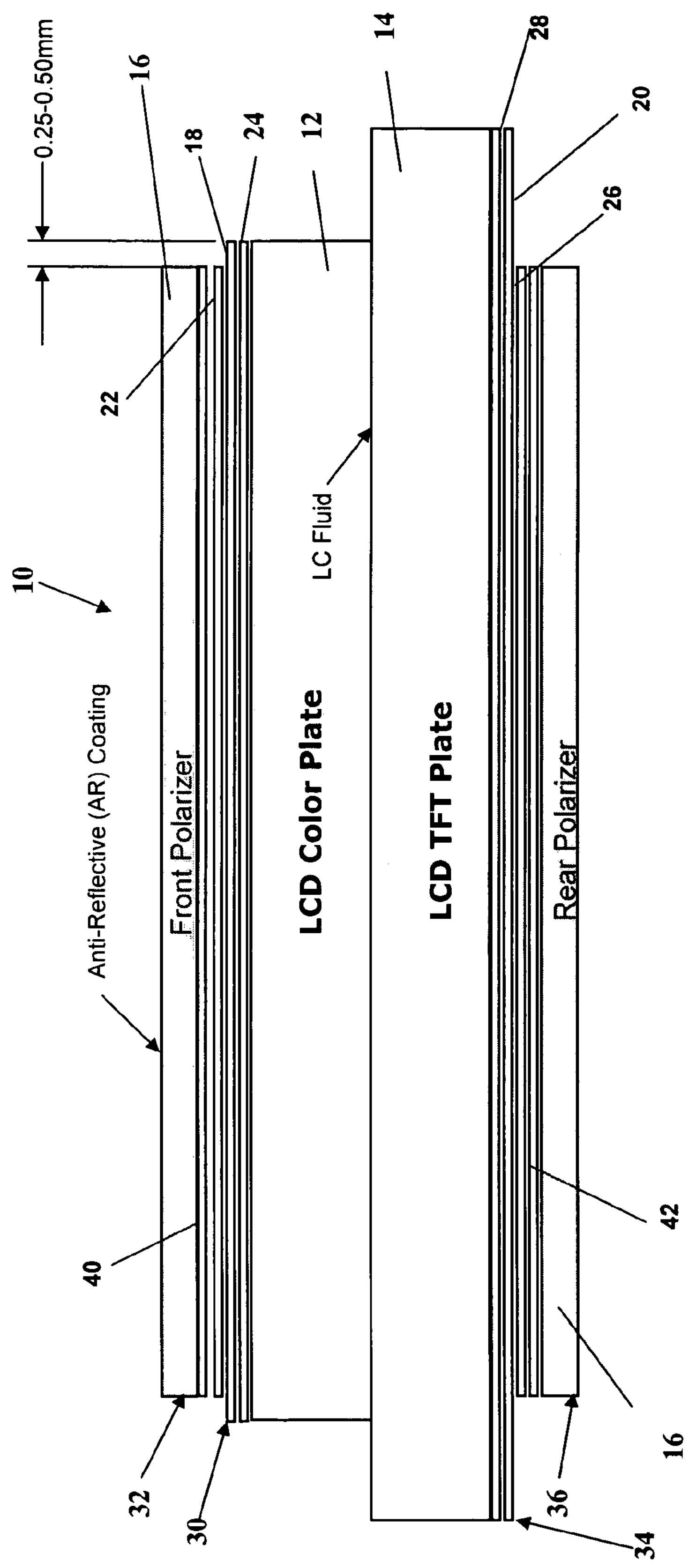
FIG. 2 illustrates one embodiment of the flat panel display of the present invention.

FIG. 1 illustrates a known display system. In known flat panel displays, the polarizer layers are placed directly on the front and back plates. FIG. 2 illustrates one embodiment of the flat panel display 10 of the present invention. According to known flat panel display technology, the display is comprised of a front plate 12 and a back plate 14. In one embodiment of the present invention, layers of Indium Tin Oxide (ITO) layers 18, 20 (with or without additional index of refraction matching dielectric layers) are placed between the outside surfaces of the front and back plates and the polarizer layers 16. In one embodiment, the front plate is a liquid crystal display (LCD) color filter (CF) plate and the back plate is an LCD thin film transistor (TFT) plate. In one embodiment the front and back plates are transparent glass substrates. According to known principles, a layer of liquid crystals are placed between the plates.

In the embodiment of FIG. 2, the front EMI shield ITO coating 18 is preferably a constant ≦15-20 ohms/sq value. A first index matching dielectric layer 22 may be placed between the EMI shield ITO layer and the front polarizer layer. A second index matching dielectric layer 24 may be placed between the EMI shield ITO layer and the front plate. When electrically bonded or grounded to the associated metal or electrically conductive chassis of the complete LCD assembly and/or its associated product chassis, this front ITO coating acts as an EMI shield. This ITO EMI shield significantly reduces radiated emissions originating from the LCD itself, as well as shields, or reduces the susceptibility of, the LCD from the effects of externally imposed electromagnetic fields.

In the embodiment of FIG. 2, the rear heater ITO coating 20 is preferably sandwiched between a first index matching dielectric layer 26 and a second index matching dielectric layer 28. The first index matching dielectric layer 26 may be placed between the heater ITO layer and the rear polarizer layer. The second index matching dielectric layer 28 may be placed between the heater ITO layer and the back plate. The index matching layers are for matching the index of refraction between the heater ITO layer and the glass and between the heater ITO layer and the Pressure Sensitive Adhesive (PSA) layers 40, 42 of the polarizer, respectively. Index matching helps keep the specular reflection to an absolute minimum, which also increases the optical transmission of the entire optical stack. The rear ITO layer is actively driven by circuitry to function as a heater. The ohm/sq value of this ITO layer may vary as desired based on performance needs and size variables.

In the preferred embodiment of FIG. 2, the outer edges 30 of the front ITO layer and the front plate extend past (e.g., 0.25-0.50 mm) the outer edges 32 of the front polarizer and first dielectric layer (if present) 18. This exposes the front ITO layer for electrical contact outboard of the polarizer edges. Similarly, two opposed outer edges 34 of the back ITO layer and the back plate extend past the outer edges 36 of the back polarizer layer and the dielectric layer (if present) 20. Thus the ITO layer is exposed for connection of the drive circuitry for the heater function.

Placing the ITO layers and the index matching layers between the polarizers and the LCD plates provides advantages over known flat panel displays (i.e., current known processes apply the coatings on separate glass plates (not directly on the LCD plates). The separate front EMI plate can be mounted free standing in front of the LCD or laminated with optical adhesive directly to the front polarizer of the LCD. The separate rear heater plate is laminated with optical adhesive directly to either the front or rear polarizer of the LCD in order to facilitate adequate heat transfer from the ITO heating layer to the liquid crystal fluid. In some known configurations, the heater ITO is decoupled (radio frequency (RF)) to the chassis ground of the LCD, so that it functions as both the EMI shield and the heater. In these cases, the heater element is typically laminated to the front polarizer of the LCD.

Placing the ITO layers, with or without index matching layers, directly on the plates results in significant cost, weight, and thickness savings, as well as improved optical performance. The process embodied in this invention also provides a more efficient coupling of the heater ITO to LCD fluid, reducing the power density required to heat the LCD fluid to a given temperature over a given period of time. This improved coupling results from having the ITO heater coated directly on the surface of the LCD glass, thereby eliminating the thermal resistance caused in known implementations by the optical adhesive, polarizer and polarizer PSA. In typical known configurations, a power density of 2 watts per square inch of display image area is required to heat the LCD fluid from −54° C. to −20° C. in ≦10 minutes. With the ITO coated directly on the rear surface of the LCD, this same heating of the LCD fluid can be accomplished with a power density of 1.8 watts per square inch of display image area.

In known flat panel display systems, where ITO layers are coated on separate glass plates that are then laminated to the outside of the polarizer, the lamination process often results in layers that contain bubbles or particulates. Displays having bubble or particulate contamination are scrapped as unsatisfactory displays. Because the contamination is not detectable until the adhesive is dry and the display is fully assembled, a contaminated laminate layer results in the loss of an entire LCD assembly. Coating the ITO, with or without index matching layers, directly on the external front and rear surfaces of the LCD glass (i.e., plates) avoids this high yield loss.

Placing the index matching ITO layers directly on the plates also prevents the undesirable effects of lamination-induced window framing (LIWF). In known flat panel displays, the ITO layers are coated directly onto separate glass plates, which are typically then laminated permanently with optical adhesive to the external surfaces of the front and/or rear polarizer(s). Due to the shrinkage of the optical adhesive during its cure, and/or differential coefficients of thermal expansion (Cte) of the ITO cover glass(es), optical adhesive, polarizer and LCD glass, the LCD glass bends or bows, changing the cell gap between the front and rear glass plates of the LCD. This cell gap deformation locally changes the image contrast, typically causing "whitening" or "darkening" degradation of contrast around the edge or periphery of the display area (i.e., "halo" effect). This effect is known as LIWF. The severity of this degradation changes with the age and operating temperature of the display. By skipping the step of laminating ITO coated glass plates to the outside surface of the polarizer layer, LIWF is avoided.

Placing the index matching ITO layers directly on the plates also enhances optical performance. The present invention has a reduced specular reflection and increased contrast over known displays which have ITO coated glass plates laminated to the outside surface of the polarizers. By placing the front ITO layer under the front polarizer layer, less light is reflected from the display. In other words, because the front polarizer is transmitting only a portion of the light from the outside (e.g., 42% of the light is transmitted by the polarizer), a corresponding smaller amount of that transmitted light is reflected by the ITO layer between the polarizer and the front plate.

The ITO layers and the index matching dielectric layers of the present invention are applied using known manufacturing processes such as sputtering or vapor deposition.

Figure 3:
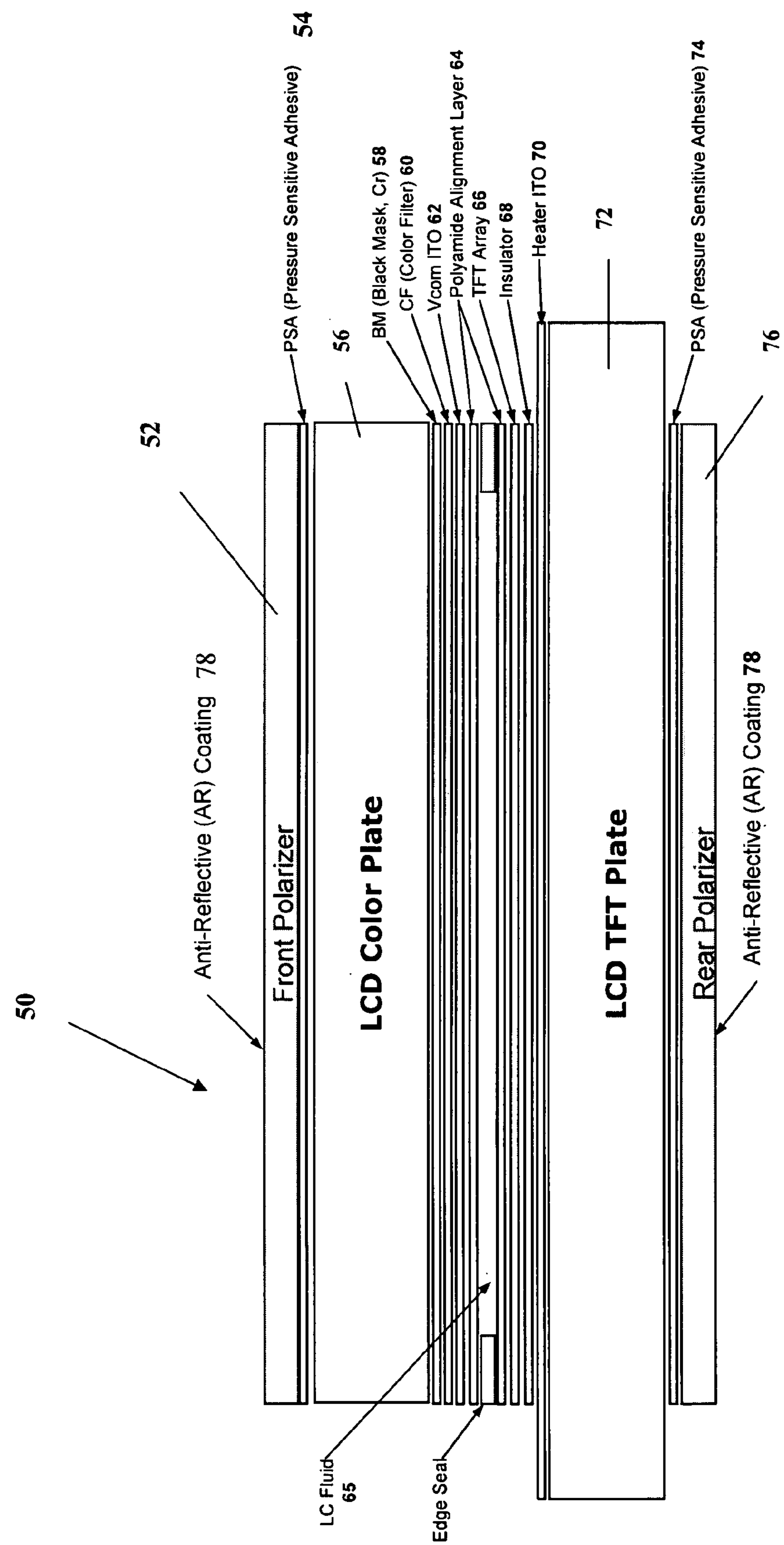
FIG. 3 illustrates an alternative embodiment of the flat panel display of the present invention.

FIG. 3 illustrates another embodiment of a flat panel display 50 of the present invention. In this embodiment, the display is preferably comprised of the following layers: a front polarizer 52, a pressure sensitive adhesive layer 54, an LCD color plate or glass layer 56, a black mask layer 58 (preferably chrome), a color filter layer 60, a Vcom ITO 62, a first and second Polyamide Alignment Layer 64, a layer of liquid crystals 65, a TFT array layer 66, and insulator layer 68, an ITO heater layer 70, a LCD TFT plate or glass 72, a second pressure sensitive adhesive layer 74, a rear polarizer layer 76, and anti-reflective coating layers 78.

In the embodiment of FIG. 3, the ITO heater layer is preferably placed on the inside surface of the glass plate allowing the ITO heater layer to be closer to the liquid crystal layer. This reduces the thermal resistance between the ITO layer and the liquid crystal layer thus reducing the amount of power necessary to heat the liquid crystal layer. Furthermore, since there are fewer intervening layers between the ITO heater and the liquid crystal layer, less power is needed to heat the liquid crystal layer. Because of the lower power requirements for powering the ITO layer, the ohms/square and therefore thickness or density of the ITO may be reduced, thereby increasing the optical transmission.

In the preferred embodiment of FIG. 3, bus bars are placed along predetermined edges of the ITO heater layer. The bus bars provide a low impedance connection along predetermined edges of the ITO heater layer. The bus bars allow for the uniform injection of current into the ITO heater layer. In one embodiment, silk screen epoxy is laid onto the ITO heater layer which is then placed in an oven and heated. Accordingly, the resulting bus bars become embedded into the ITO layer.

In this embodiment, it is preferred that the black mask layer, preferably comprised of chrome, be electrically tied to the zero potential chassis. Accordingly, the black mask layer acts as an EMI layer. In an alternate embodiment, index matching dielectric layers can be sandwiched around the ITO heater layer to provide the benefits discussed earlier. The insulator layer could also be used as an index matching dielectric layer. In one embodiment, the black mask layer is applied through known vapor deposition or sputtering techniques.

FIG. 4 illustrates another alternative embodiment of the flat panel glass and display illustrated in FIG. 3. FIG. 4 is the preferred embodiment of the flat panel display of the present invention. In the preferred embodiment, the LCD is a TFT active matrix liquid crystal display (AMLCD) with source and gate drive flexible tape carrier package (TCP) connections 84. In the embodiment of FIG. 4, the heater layer 80 and thermal sensors (shown generally at 82) are integral to the flat panel display as they are applied to the TFT array structure. The flat panel display of FIG. 4 avoids the high yield loss and LIWF issues of the prior art displays as previously discussed.

In the embodiment of FIG. 4, the LCD is comprised of a black mask EMI shield interposed between the front and rear glass plates. LCDs radiate EMI (radiated emissions) and are also susceptible to high strength EMI fields (radiated susceptibility). To guard against these EMI problems in sensitive environments (i.e., military applications, aircraft applications, etc.), an optically transmissive, low electrical resistance layer is used to cover the entire active area of the displayed image. Historical solutions have involved optically laminating or bonding a cover glass to the front of the LCD that has either been coated with an 8-20 ohm/square Indium Tin Oxide (ITO) layer or contains a low resistance black oxide wire mesh. The EMI shield absorbs and conducts the interference signal from the display. Using a cover glass is costly and electrical termination is labor intensive due to the use of electrically conductive bus bars and associated wire/foil leads. The use of cover glasses also creates optical problems because the ITO or wire mesh—reduces optical transmission and increases ambient light reflections that both contribute to reduced image luminance and contrast. To compensate for the reduced luminance and contrast, higher intensity backlights are used which leads to greater system costs, higher display operating temperature (reduced life) and greater system power consumption (more increased system costs). Furthermore, with wire mesh, image moiré (i.e., optically distracting black and white moving pattern caused by optical interference between the mesh and pixel structures) can never be eliminated.

In the preferred embodiment of the black mask EMI shield, the gate, source, heater bus lines, pixel capacitors, and pixel feed-throughs are covered by the low reflection, electrically conductive (e.g., less than or equal to 10.0 ohms/square) black mask when viewed from any angle, preferably over the entire viewing area. Electrical connection to the black mask is preferably accomplished through the source TCPs and through a flex printed circuit (FPC) across the display.

The black mask is preferably applied with the known process of sputtering or evaporating (i.e., vacuum deposition). The layers are preferably applied to reduce the ohms/square resistance from approximately 20-30 ohms/square to 8-10 ohms/square. Accordingly, in the preferred embodiment, the black mask is the very first layer deposited and adhered to the inside of the front plate (i.e., color plate) of the LCD. Vcom, on most LCD panels, is some positive voltage around 4-7 volts. By isolating the black mask from Vcom, the Vcom electrical potential (and normal functions of the LCD) is left undisturbed. By connecting the black mask to chassis ground, a low DC and RF (radio frequency) resistance/impedance Faraday cage or EMI shield is established between the "outside" world and the TFT transistors of the LCD. Therefore, the isolated and chassis grounded black mask forms an EMI shield between the active electronics of the LCD and the outside world. This reduces the radiated emissions from the LCD panel, as well as increases the resistance of the LCD panel to radiated susceptibility (i.e., image degradation caused by the influence of external electrical fields), without having to add some external feature (i.e., a laminated ITO coated piece of cover glass). In addition, since the black mask does not cover or obscure the active pixel aperture, the integral EMI shield does not reduce any light transmission through the LCD (i.e., an externally laminated ITO coated piece of glass has less than 100% optical transmission and thereby reduces light transmission thought the LCD). Also, an externally laminated ITO piece of cover glass has a specular and diffuse reflection of >0.0%, thereby increasing the reflectivity of the LCD, which reduces image contrast (particularly when combined with the reduced light transmission of the laminated cover glass). None of these optical degradations occur with our integral EMI shield (i.e., no increase in specular and diffuse reflectance, no reduction in LCD optical transmission, and no reduction in image contrast).

The black mask (BM) EMI shield of the present invention uses an existing structure within the LCD to perform an additional function. Other than the very low cost addition of an optically clear resin dielectric (insulating) layer 83 between the black mask and the Vcom ITO (already existing structures within the LCD) there are no items added to degrade the image quality.

Figure 5:
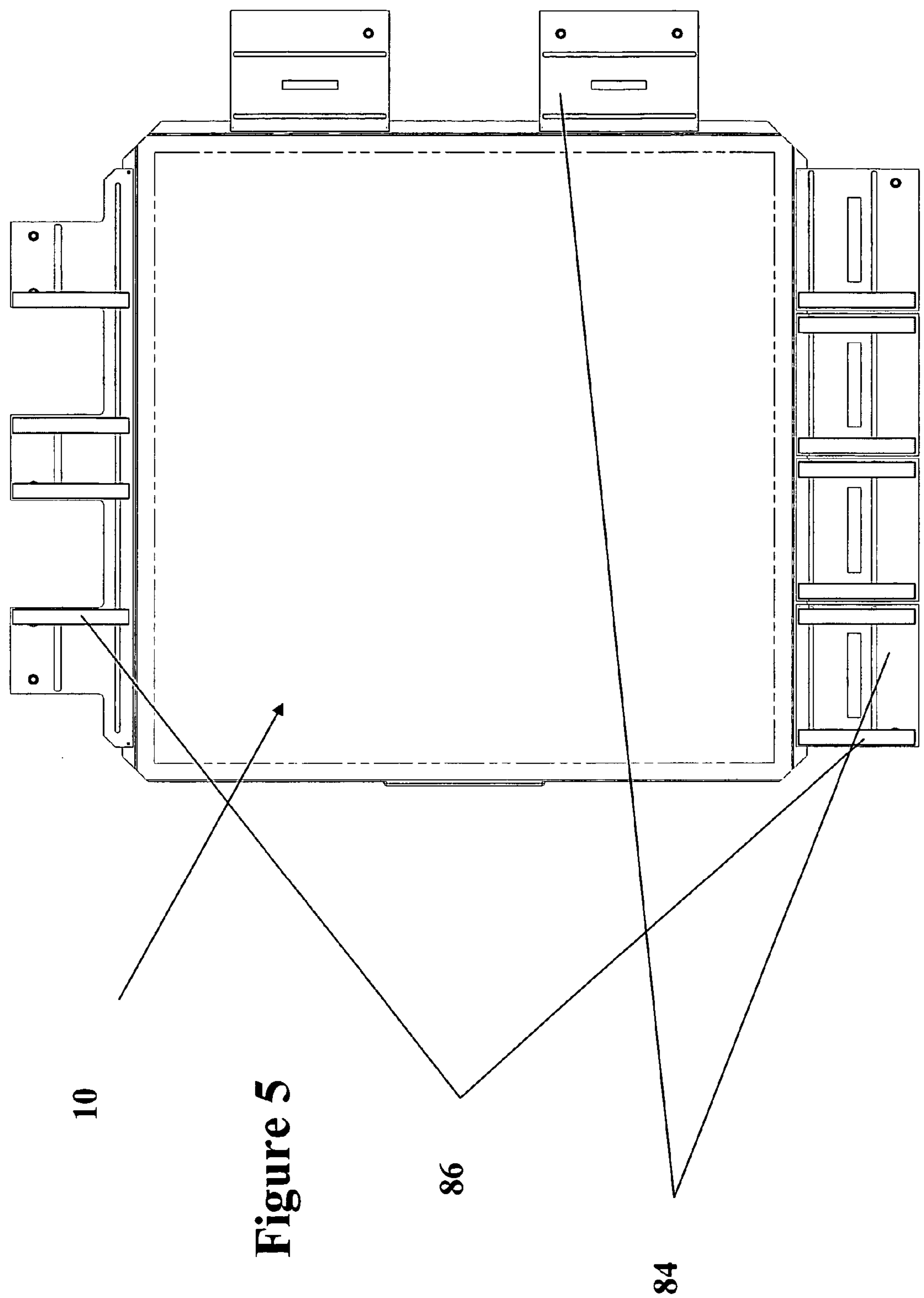
FIG. 5 illustrates a plan view of one example of a flat panel display of the present invention showing flexible TCP connections.
Figure 6:
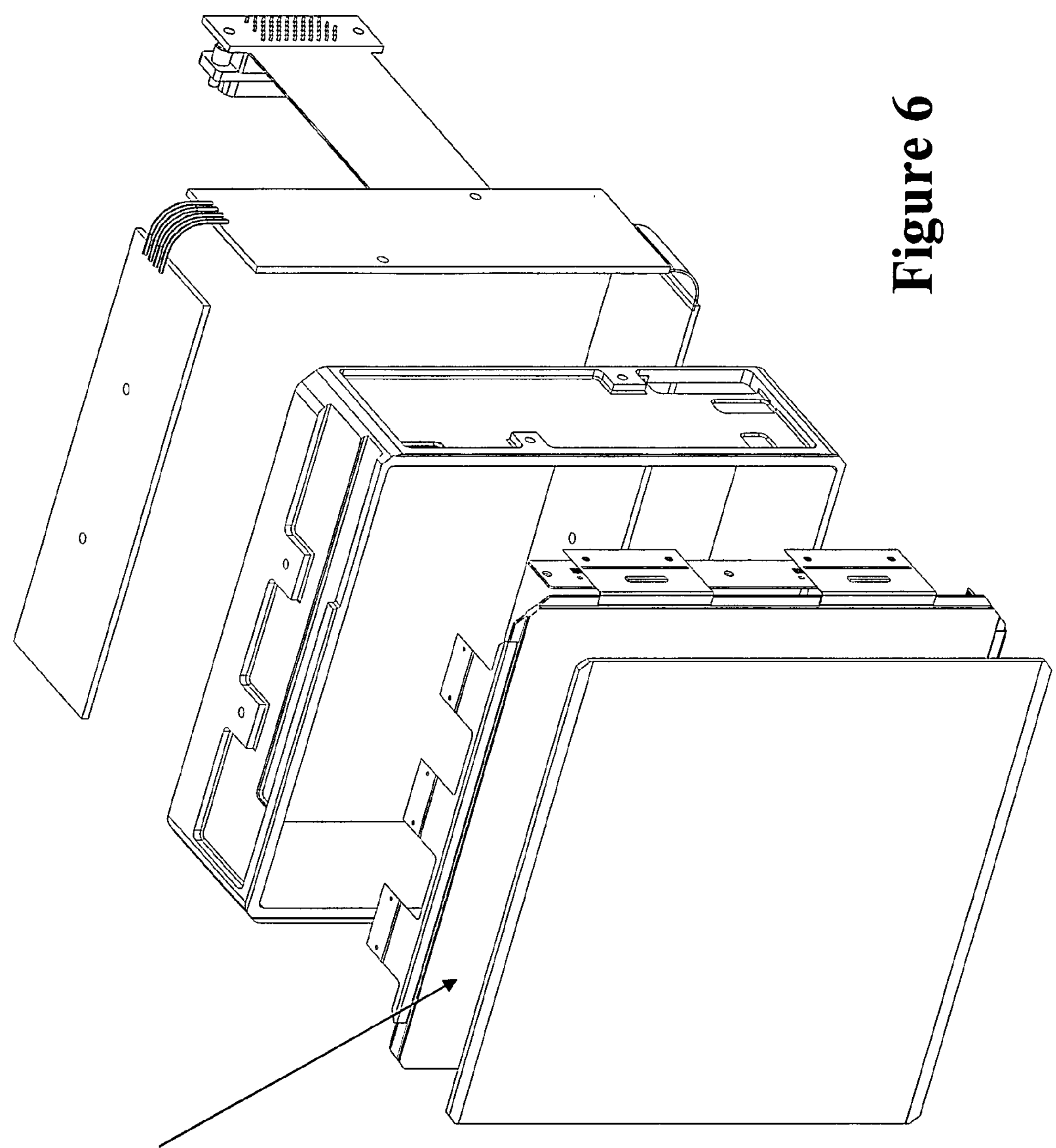
FIG. 6 illustrates a perspective blow-up view of one embodiment of a display incorporating the flat panel display of the present invention.

FIG. 5 illustrates one example embodiment of a flat panel display having flexible TCP connections. Connections to the internal EMI shield are accomplished through the TCP. In this example embodiment, heater channels: 4-60, 89-145, 174-230, 259-315 (total: 228 channels); black mask channels: 65-84, 150-169, 235-254 (total: 60 channels); dummy channels: 1-3, 61-64, 85-88, 146-149, 170-173, 231-234, 255-258, 316-318 (total: 30 channels) are used. The source and gate drive flexible tape carrier package (TCP) connections are shown at 84. The EMI bonding pads are illustrated at 86. FIG. 6 illustrates a perspective blow-up view of one embodiment of the flat panel display of the present invention illustrating the TCP connections.

Figure 7:
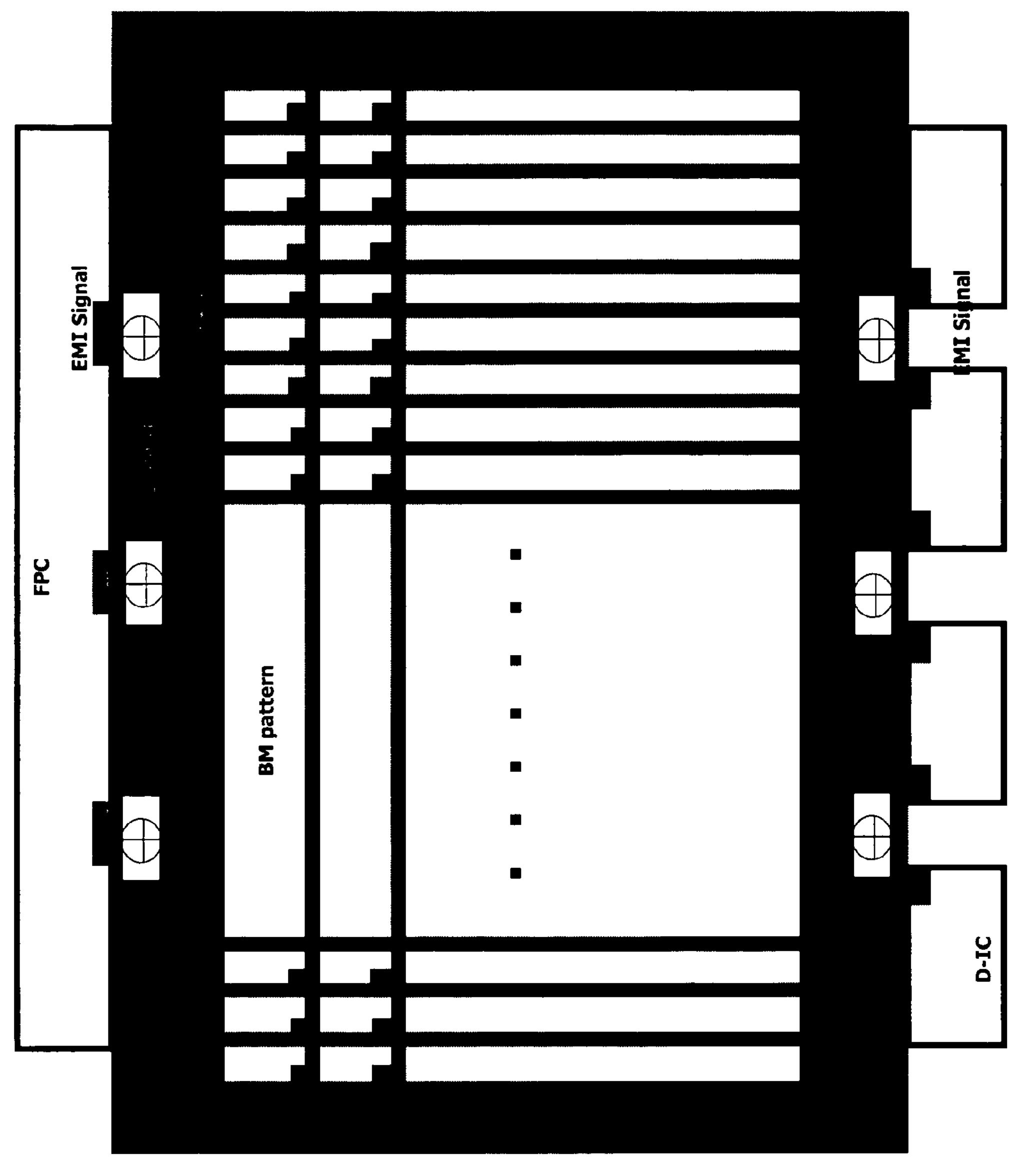
FIG. 7 illustrates a plan view of one embodiment of the black mask EMI shield layer of the present invention.

FIG. 7 illustrates a plan view of one embodiment of the black mask EMI shield layer of the present invention. It is preferred that the black mask resistivity be <10 ohms per square. In one embodiment the black mask is comprised of a CrOx/CrNx/Cr, 350/350/1020A, layer.

In the embodiment of FIG. 4, an integral metal heater 80 (shown in black) is used instead of the ITO heater layer. In the preferred embodiment, metal heater is patterned on top of the passivation layer of the thin film transistors (TFTs) and then overcoated with another passivation layer to electrically isolate the metal layer from the pixel capacitors. Because the heater layer is closer to the liquid crystal layer, thermal resistance is reduced between the heater and the liquid crystal layer thus reducing the amount of power necessary to heat the liquid crystal layer. Again, since there are fewer intervening layers between the heater and the liquid crystal layer, less power is needed to heat the liquid crystal layer.

Figure 8:
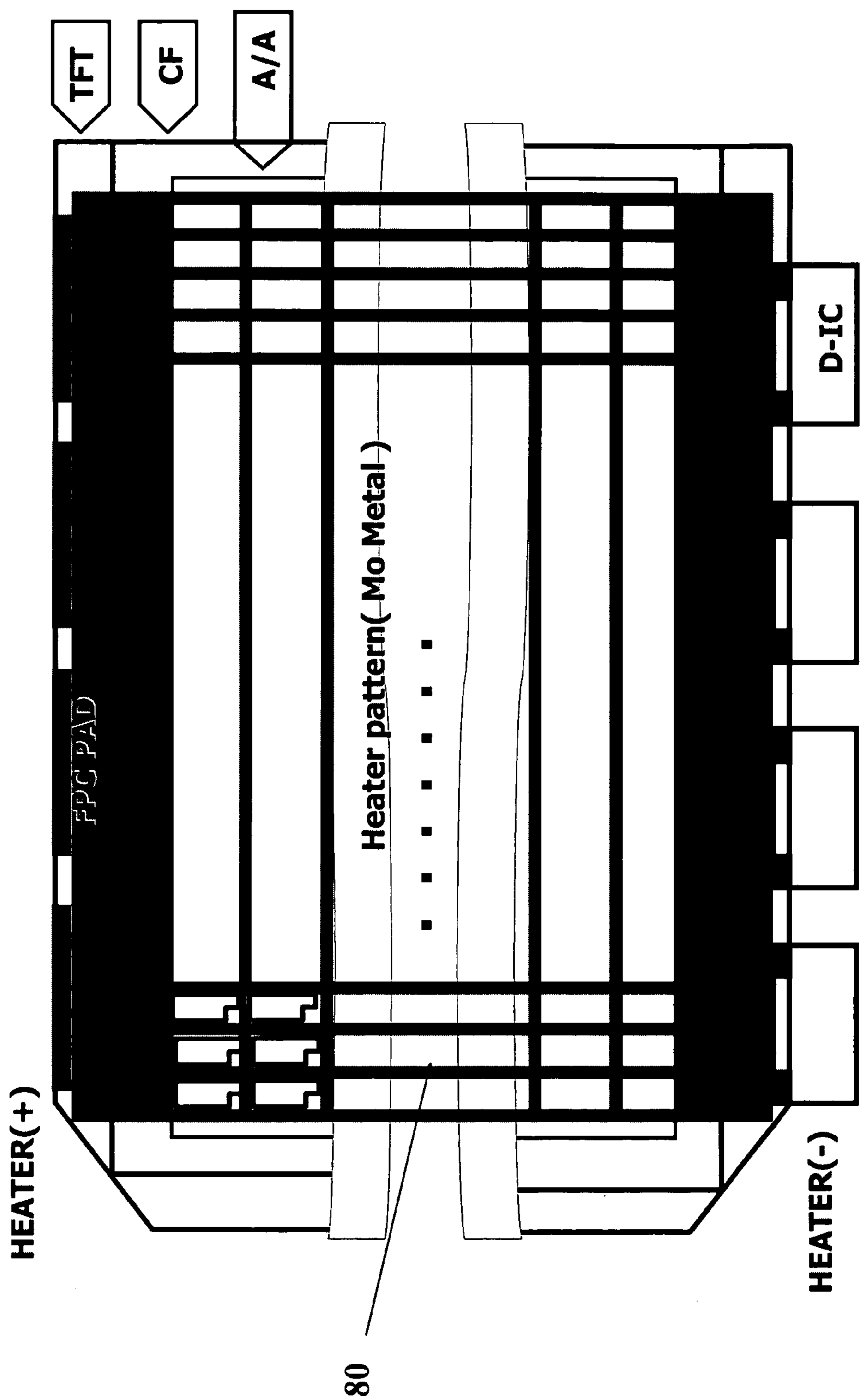
FIG. 8 illustrates a plan view of one embodiment of a metal heater layer of the present invention.

FIG. 8 illustrates a plan view of one embodiment of a metal heater layer of the present invention. It is preferred that the integral metal heater be hidden behind the black mask EMI layer so that no portion of the heater is visible and no portion of the heater interferes with the pixel apertures. The LCD liquid crystal (LC) fluid is heated to preserve response time (i.e., prevent image smearing of rapid image movement) at lower display module temperatures (usually somewhere below 0 degrees C.). To accomplish this, historic solutions have involved optically laminating or bonding a cover glass to the front or rear of the LCD that is coated with an Indium Tin Oxide (ITO) layer whose electrical resistance is selected to produce a power dissipation of typically 2 watts/square inch of image area when the heater voltage is applied. This typical method is costly (e.g., the heater glass is expensive) and electrical termination is labor intensive (i.e., required electrically conductive bus bars and associated wire/foil leads). Furthermore, the typical heating technologies are prone to handling damage resulting in unusable LCDs. These historic heater technologies also created optical problems due to reduced optical transmission and increased ambient light reflections. Accordingly, these typical LCDs have reduced image luminance and contrast.

The integral metal heater of the present invention is comprised of structure within the LCD to perform the heater function. The integral metal heater is preferably made by two additional photolithography steps, which does increase the cost of the LCD cell, but to only a fraction of the cost of an external heater. The metal heater is preferably optically hidden under the black mask (BM). Therefore, there is no reduction in LCD optical transmission and image luminance, no increase in ambient light reflections, no degradation in image contrast, and no issues with heater electrical termination. Electrical termination is preferably accomplished automatically with known TCP and anisotropic conductive film (ACF) termination. The TCP connection between the LCD and display electronics is advantageous as it provides a flexible connection.

Preferably, the heater pattern is comprised of a horizontal and vertical grid of controlled resistance heater conductors, with low resistance horizontal “heater+” bus bar at the top of the vertical grid (e.g., preferably less than or equal to 0.5 ohms) and a low resistance “heater−” bus bar at the bottom of the vertical grid. It is preferred that all portions of the heater grid be outside of the active pixel aperture and hidden from view under the black mask. The exact heater grid pattern is located to minimize capacitive coupling between the heater grid and the gate and source bus lines. In the preferred embodiment, there are heater grid lines under each horizontal and vertical leg of the black mask.

Preferably, the heater grid is over-coated with an insulating dielectric having a breakdown potential of over 100 volts DC. Connections to the heater−(i.e., the bottom bus adjacent to the source TCPs) are preferably routed to associated traces on the source TCPs. Heater−is preferably connected, in the source PCB, to ground potential. Connections to the heater+(i.e., top bus bar or the bar on the edge opposite the source TCPs) are preferably routed to pads on the exposed areas of the front side of the rear glass (i.e., TFT plate) for ACF connection to the heater and black mask EMI FPC. During heater operation, heater+is preferably connected to 28 VDC through the heater and black mask EMI FPC. When the heater is not operating, the heater+connection is preferably connected to heater−and ground.

Figure 9:
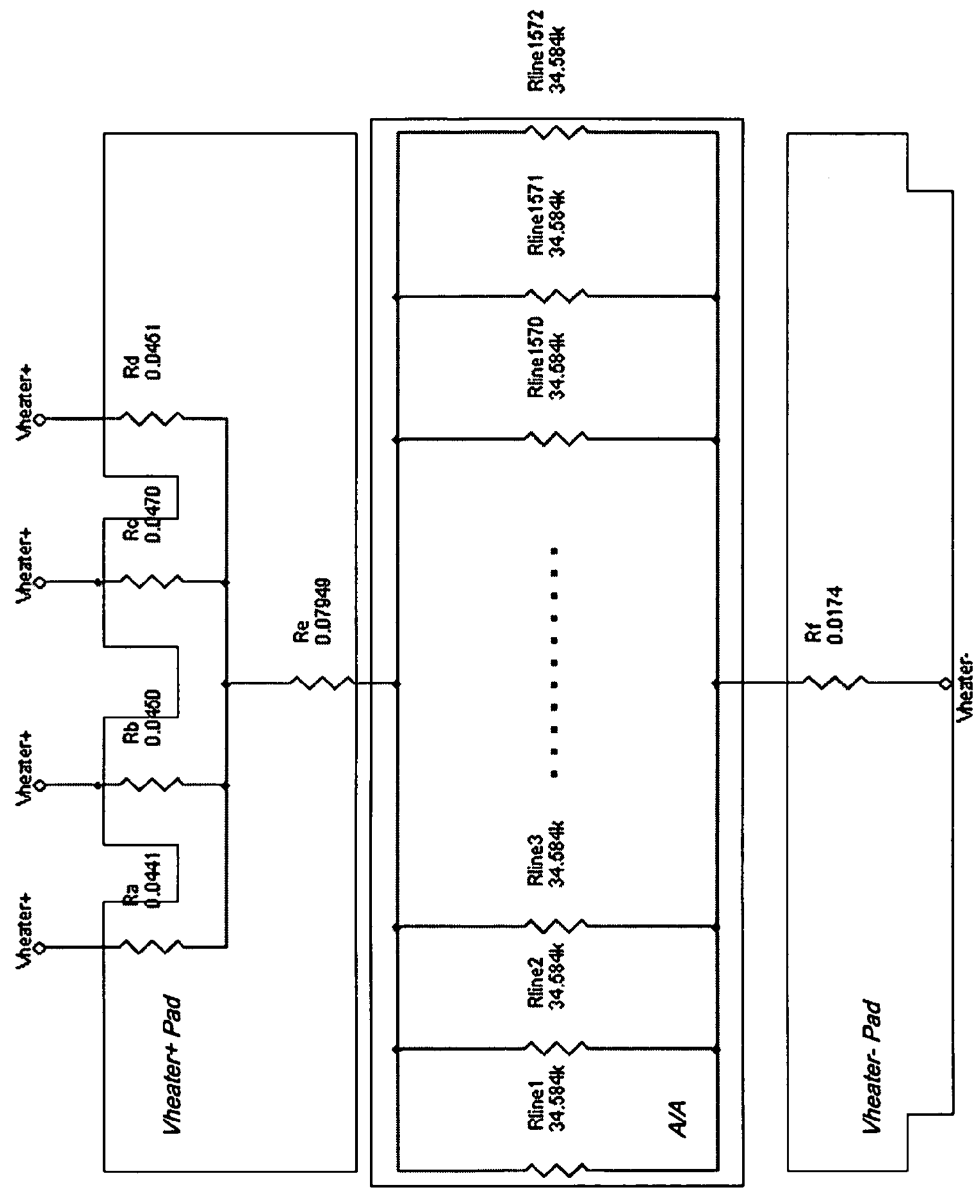
FIG. 9 illustrates one example embodiment of a heater circuit of the present invention.

In the preferred embodiment, all features of the patterned heater, including the heater+and heater−bars are covered by the black mask in the assembled LCD cell so that no heater pattern or heater bus bar features are visible in the display image. FIG. 9 illustrates one example embodiment of a heater circuit of the present invention.

Figure 10A:
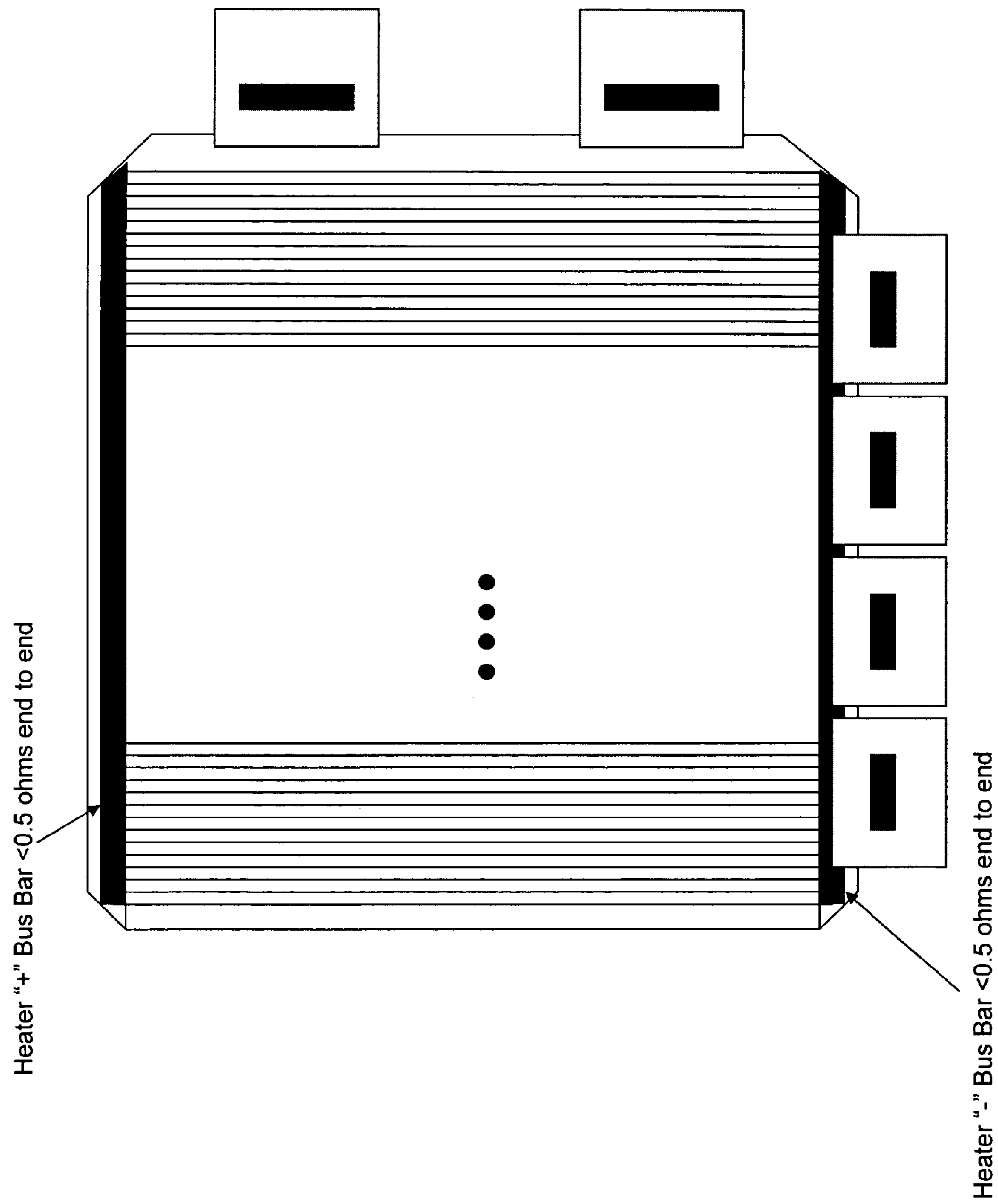
FIGS. 10A-B illustrate other integral heater designs.
Figure 10B:
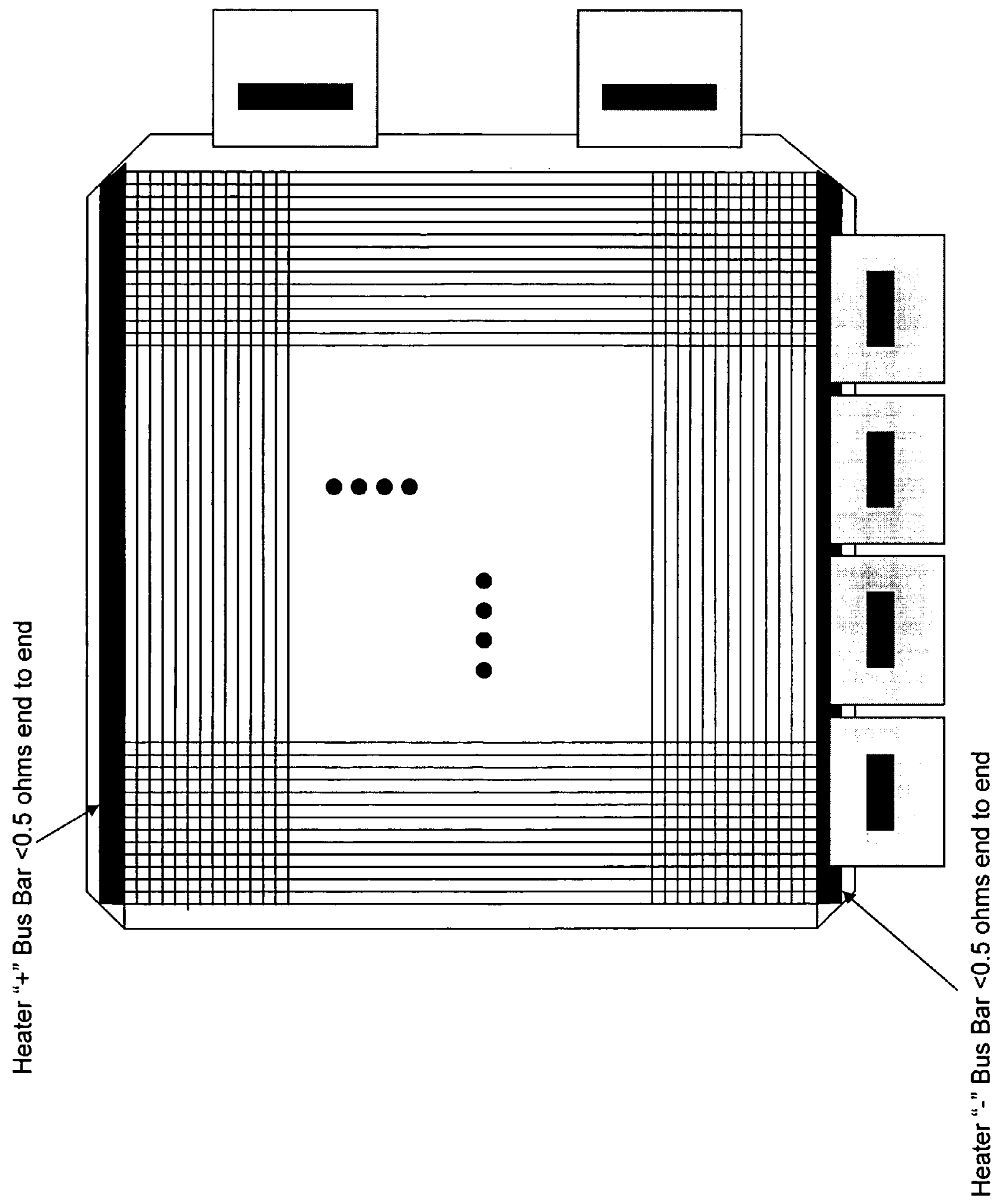

FIGS. 10A-B illustrate other integral heater designs. FIG. 10A illustrates a vertical parallel heater design. In this embodiment, the heater conductors preferably lie directly under source bus lines. The heater lines are preferably narrower than the bus lines and do not intrude into the sub-pixel apertures. This minimizes capacitive coupling to the pixel capacitor and eliminates reduction in panel transmission by the heater. FIG. 10B illustrates one example grid design having 525 horizontal and 525 vertical lines. In this embodiment, the heater conductors preferably lie directly under source and gate bus lines and are narrower than the bus lines and do not intrude into the sub-pixel apertures. In alternate embodiments, the number of horizontal and vertical heater lines may vary. For example, the heater grid pattern may be 525 horizontal and 1,573 vertical lines; 525 horizontal and 787 vertical lines; or 768 half-width horizontal lines and 1,536 vertical lines. In an alternate embodiment, the heater grid patterns may be varied to provide a greater heater grid density around the periphery of the display. The heater grid density would decrease moving towards the center of the display. Placing a higher density grid pattern around the periphery allows for the application of more heat around the edges of the display to account for the higher thermal mass due to the bezel attachment around the periphery of the display. In other words, due to the bezel attachment, more heat is required around the periphery of the display to achieve the same degree of display heating. Accordingly, the thermal rise of the display is substantially consistent for the edges and center of the display.

Figure 11:
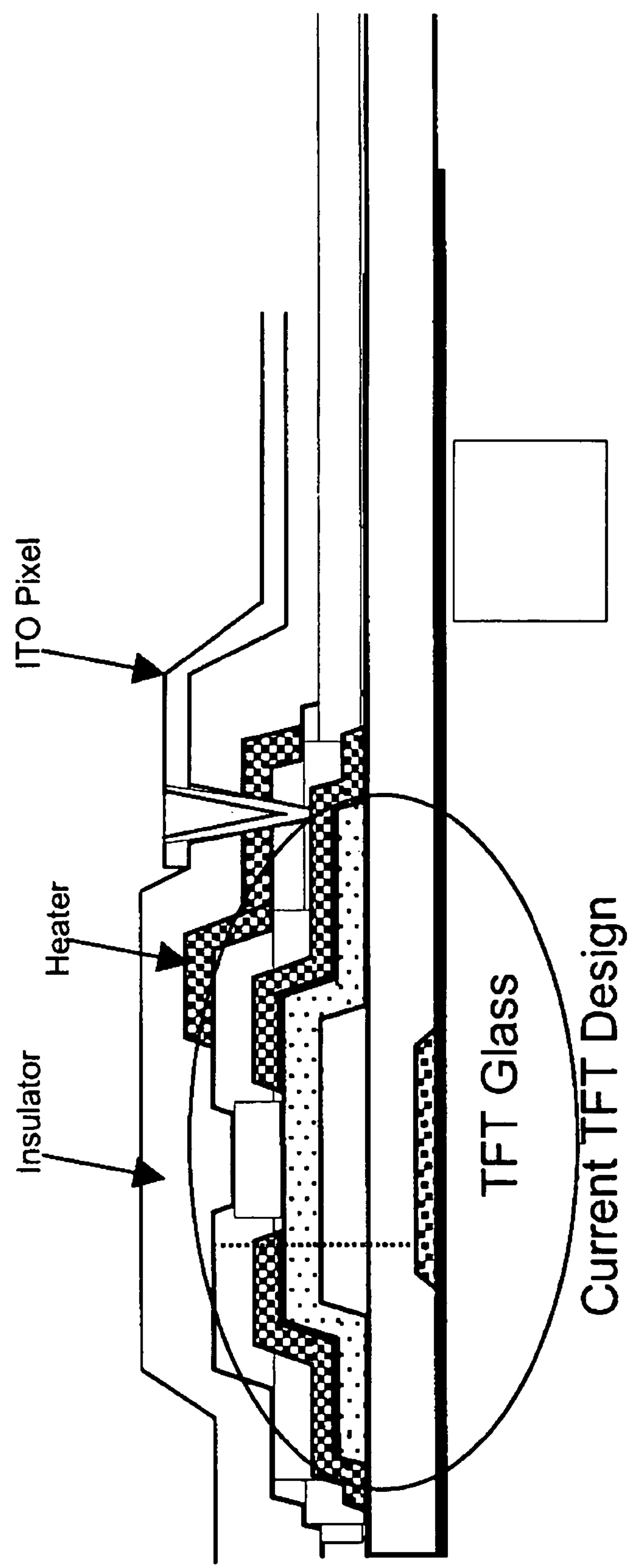
FIG. 11 illustrates one embodiment of a TFT design of the present invention with integral heater.

As discussed, the integral metal heater of the present invention is applied by known bus metallization techniques. FIG. 11 illustrates one embodiment of a TFT design of the present invention with integral heater.

As shown in the embodiment illustrated in FIG. 4, it is also preferred that thermal sensors 82 be placed on the inside portion of the glass plates. Preferably, the sensors are in close proximity to the heater layer to detect the heat being inputted into the liquid crystal layer so as to provide timely feedback to the system. The integral thermal sensors are also applied onto the TFT array layer preferably under the black mask EMI layer. In this embodiment, thermal resistivity is reduced leading to faster thermal sensor and heater control response times.

The integral thermal sensor of the present invention provides an efficient, low cost solution as there are no separate thermal sensor components that must be purchased. Furthermore, there is no process time or labor required to attach a thermal sensor to the LCD or to attach thermal sensor wires to a circuit. With the integral thermal sensor, signal attachment automatically occurs with ACF attachment of the TCP attachment. The intimate contact between sensor and LCD fluid provides higher accuracy and reduced time lag between actual fluid temperature and thermal sensor readings.

Figure 12:
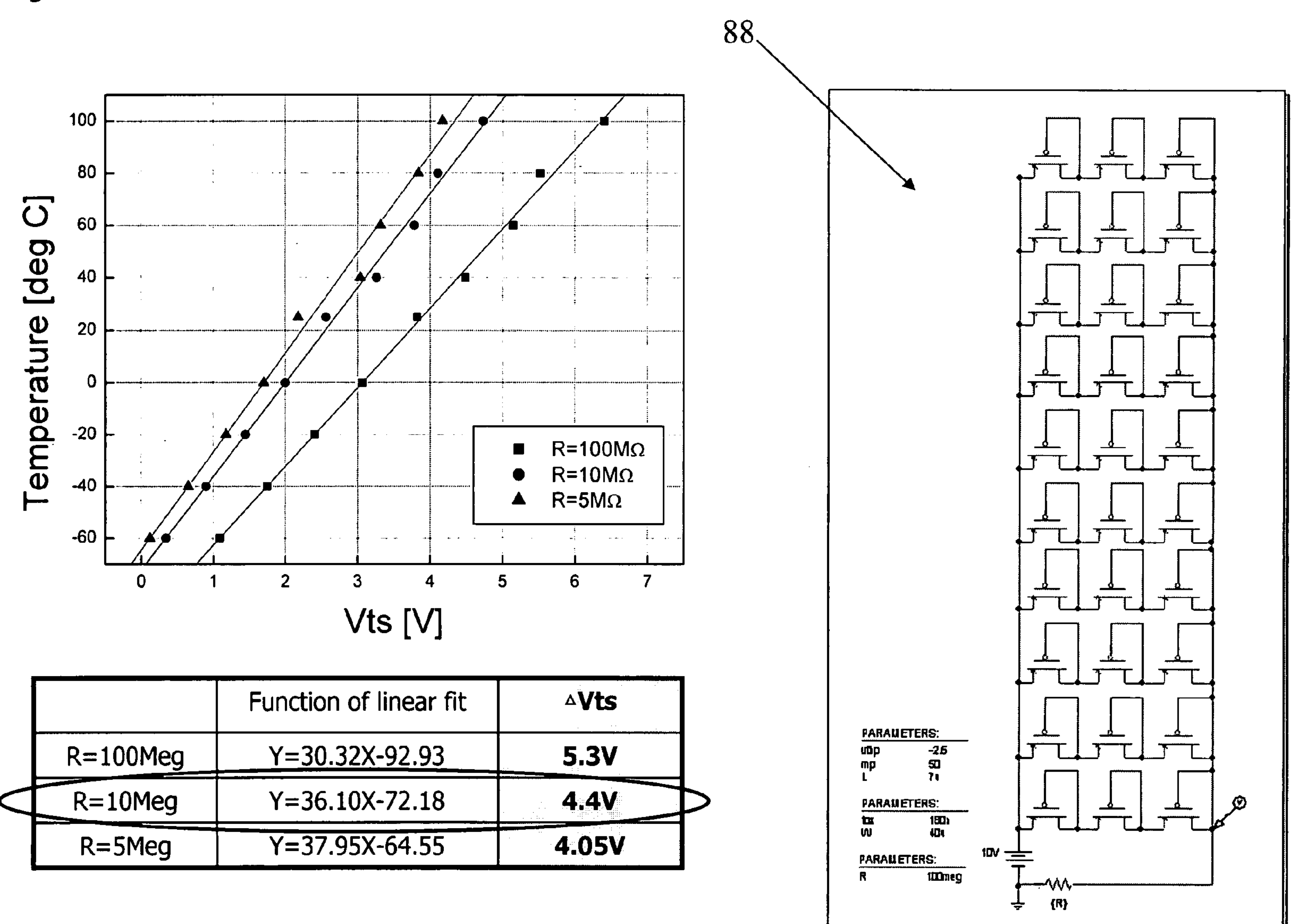
FIG. 12 illustrates one embodiment of a thermal sensor diode array of the present invention.

In the preferred embodiment, a series/parallel array of diodes is embedded within the TFT array to sense the temperature of the LC fluid. FIG. 12 illustrates one embodiment of a diode array 88 of the present invention. In this embodiment, the thermal sensors are comprised of a diode array (e.g., 3 in series, 10 parallel) built into the TFT array layer.

The anodes of the top array are preferably connected to a common node and brought out of the source TCP as "Thermal Sensor+". The cathodes at the bottom of the diode array are preferably connected to common node and brought out of the source TCP as "Thermal Sensor−".

The number of diodes in each array may vary, however in the preferred embodiment, the number of diodes shall be selected to provide a nominal 2.5V to 5.0V change in the diode string forward bias potential as the LC fluid changes from −60 degrees C. to +100 degrees C.

Figure 13:
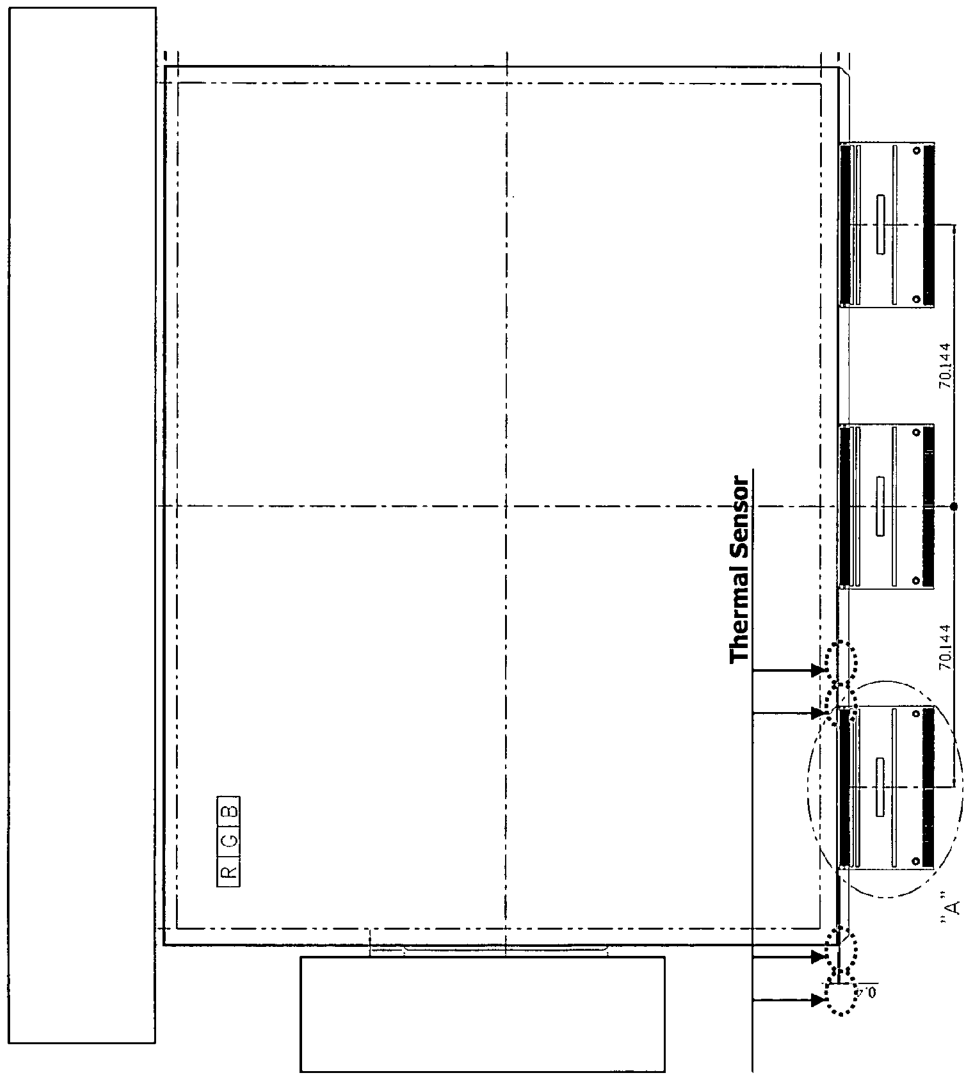
FIG. 13 illustrates a plan view of a flat panel display showing thermal sensor placement.

In the preferred embodiment, a thermal sensor diode array according to the present invention is located and electrically connected between each source TCP. For example, if there are four TCPs there will be three thermal sensor diode arrays. FIG. 13 illustrates a plan view of a flat panel display showing thermal sensor placement.

FIG. 14 illustrates an example block diagram of the electrical components and connections of a display incorporating the flat panel display of the present invention.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. A flat panel display comprising:

a front plate;

a rear plate;

a layer of liquid crystals and a TFT array layer, both interposed between said front and rear plates; and at least one thermal sensor integral to the TFT array and hidden by an EMI layer to provide temperature sensing of said layer of liquid crystals.

2. A flat panel display according to claim 1, wherein said at least one thermal sensor is comprised of an array of diodes.

3. A flat panel display according to claim 1, wherein the at least one thermal sensor is applied onto the TFT array layer.

4. The flat panel display of claim 1, wherein:

the thermal sensor provides a nominal 2.5 volt to 5.0 volt change in bias potential as the liquid crystal temperature changes from −60 degrees Celsius to 100 degrees Celsius.

5. The flat panel display of claim 1, wherein each at least one thermal sensor lies under the EMI layer.

6. The flat panel display claim 1, wherein the EMI layer is a black mask EMI layer.

* * * * *

UNITED STATES PATENT AND TRADEMARK OFFICE

CERTIFICATE OF CORRECTION

PATENT NO. : 7,292,291 B2
APPLICATION NO. : 10/769838
DATED : November 6, 2007
INVENTOR(S) : Dunn et al.

It is certified that error appears in the above-identified patent and that said Letters Patent is hereby corrected as shown below:

On the Title Page Item (75) please delete "William R. Dunn, Alpharetta, GA (US); Keuk-Sang Kwon, Kumi (KR); Hyoung-Yol Park, Kumi (KR); IN-Byeong Kang, Kumi (KR)" and replace with "William R. Dunn, Alpharetta, GA (US)"

Signed and Sealed this

Second Day of June, 2009

JOHN DOLL
*Acting Director of the United States Patent and Trademark Office*